(12) United States Patent
Shahparnia et al.

(10) Patent No.: US 9,280,220 B2
(45) Date of Patent: Mar. 8, 2016

(54) PULSE- OR FRAME-BASED COMMUNICATION USING ACTIVE STYLUS

(71) Applicant: Atmel Corporation, San Jose, CA (US)

(72) Inventors: Shahrooz Shahparnia, Monte Sereno (CA); Vivek Pant, San Jose, CA (US); Esat Yilmaz, Santa Cruz, CA (US); Vemund Kval Bakken, Tiller (NO); Kishore Sundara-Rajan, San Jose, CA (US); John Stanley Dubery, Basingstoke (GB); Martin J. Simmons, Whiteley (GB); Sherif Hanna, Foster City, CA (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 14/593,349

(22) Filed: Jan. 9, 2015

(65) Prior Publication Data

US 2015/0116271 A1 Apr. 30, 2015

Related U.S. Application Data

(63) Continuation of application No. 13/363,043, filed on Jan. 31, 2012, now Pat. No. 8,933,899.

(60) Provisional application No. 61/553,114, filed on Oct. 28, 2011.

(51) Int. Cl.
  *G06F 3/038* (2013.01)
  *G06F 3/044* (2006.01)
  *G06F 3/0354* (2013.01)
  *G06F 3/041* (2006.01)

(52) U.S. Cl.
  CPC .............. *G06F 3/0383* (2013.01); *G06F 3/038* (2013.01); *G06F 3/03545* (2013.01); *G06F 3/044* (2013.01); *G06F 3/0416* (2013.01)

(58) Field of Classification Search
  None
  See application file for complete search history.

(56) References Cited

U.S. PATENT DOCUMENTS

| 4,695,680 | A | 9/1987 | Kable |
| 5,973,677 | A | 10/1999 | Gibbons |
| 7,612,767 | B1 | 11/2009 | Griffin |
| 7,663,607 | B2 | 2/2010 | Hotelling |
| 7,875,814 | B2 | 1/2011 | Chen |
| 7,920,129 | B2 | 4/2011 | Hotelling |

(Continued)

FOREIGN PATENT DOCUMENTS

WO 2012129247 9/2012

OTHER PUBLICATIONS

U.S. Appl. No. 61/454,936, filed Mar. 21, 2011; Applicant: Myers.

(Continued)

*Primary Examiner* — Joseph Feild
*Assistant Examiner* — Emily Frank
(74) *Attorney, Agent, or Firm* — Baker Botts L.L.P.

(57) ABSTRACT

In one embodiment, a method includes receiving sensor data from one or more sensors in or on a stylus, the stylus including one or more electrodes and one or more computer-readable non-transitory storage media embodying logic for wirelessly transmitting signals to a device through a touch sensor of the device. The method includes generating a carrier signal and modulating the carrier signal to communicate the sensor data and wirelessly transmitting from the stylus to the device the carrier signal as modulated through the touch sensor of the device.

18 Claims, 8 Drawing Sheets

(56) References Cited

U.S. PATENT DOCUMENTS

| | | |
|---|---|---|
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 8,278,571 B2 * | 10/2012 | Orsley .................... G06F 3/044 178/18.03 |
| 2008/0158165 A1 | 7/2008 | Geaghan |
| 2008/0238885 A1 | 10/2008 | Zachut |
| 2009/0095540 A1 | 4/2009 | Zachut |
| 2009/0115725 A1 | 5/2009 | Shemesh |
| 2009/0127005 A1 | 5/2009 | Zachut |
| 2009/0153152 A1 | 6/2009 | Maharyta |
| 2009/0184939 A1 | 7/2009 | Wohlstadter |
| 2009/0251434 A1 | 10/2009 | Rimon |
| 2009/0315854 A1 | 12/2009 | Matsuo |
| 2010/0006350 A1 | 1/2010 | Elias |
| 2010/0155153 A1 | 6/2010 | Zachut |
| 2010/0292945 A1 | 11/2010 | Reynolds |
| 2010/0315384 A1 | 12/2010 | Hargreaves |
| 2011/0007029 A1 | 1/2011 | Ben-David |
| 2012/0050231 A1 * | 3/2012 | Westhues ............ G06F 3/03545 345/179 |
| 2012/0105362 A1 | 5/2012 | Kremin |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2012/0327041 A1 | 12/2012 | Harley |

OTHER PUBLICATIONS

U.S. Appl. No. 61/454,950, filed Mar. 21, 2011; Applicant: Lynch.

U.S. Appl. No. 61/454,894, filed Mar. 21, 2011; Applicant: Rothkopf.

Kyung, Ki-Uk et al., "wUbi-Pen : Windows Graphical User Interface Interacting with Haptic Feedback Stylus," SIGGRAPH,, Los Angeles, California (Aug. 2008).

Lee, Johnny C. et al., "Haptic Pen: A Tactile Feedback Stylus for Touch Screens," UIST '04, vol. 6, Issue 2, Santa Fe, New Mexico (Oct. 2004).

Song, Hyunyoung et al., "Grips and Gestures on a Multi-Touch Pen," CHI 2011, Session: Flexible Grips & Gestures, Vancouver, BC, Canada (May 2011).

Tan, Eng Chong et al., "Application of Capacitive Coupling to the Design of an Absolute-Coordinate Pointing Device," IEEE Transactions on Instrumentation and Measurement, vol. 54, No. 5 (Oct. 2005).

* cited by examiner

PULSE- OR FRAME-BASED COMMUNICATION USING ACTIVE STYLUS

RELATED APPLICATIONS

This application is a continuation, under 35 U.S.C. 120, of U.S. patent application Ser. No. 13/363,043, filed 31 Jan. 2012, which claims the benefit, under 35 U.S.C. §119(e), of U.S. Provisional Patent Application No. 61/553,114, filed 28 Oct. 2011.

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as, for example, resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
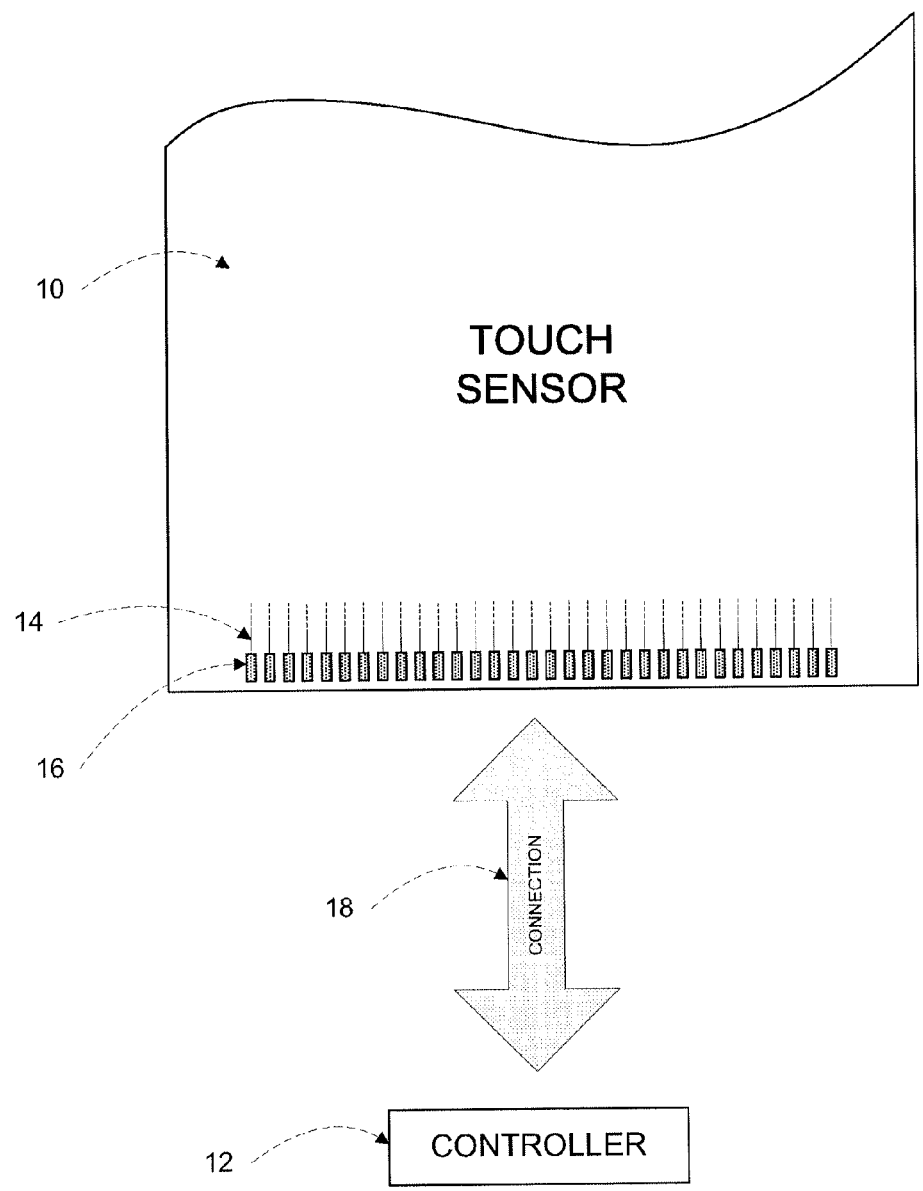
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, guard electrode, drive electrode, or sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as a 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices (PLDs) or programmable logic arrays (PLAs), application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
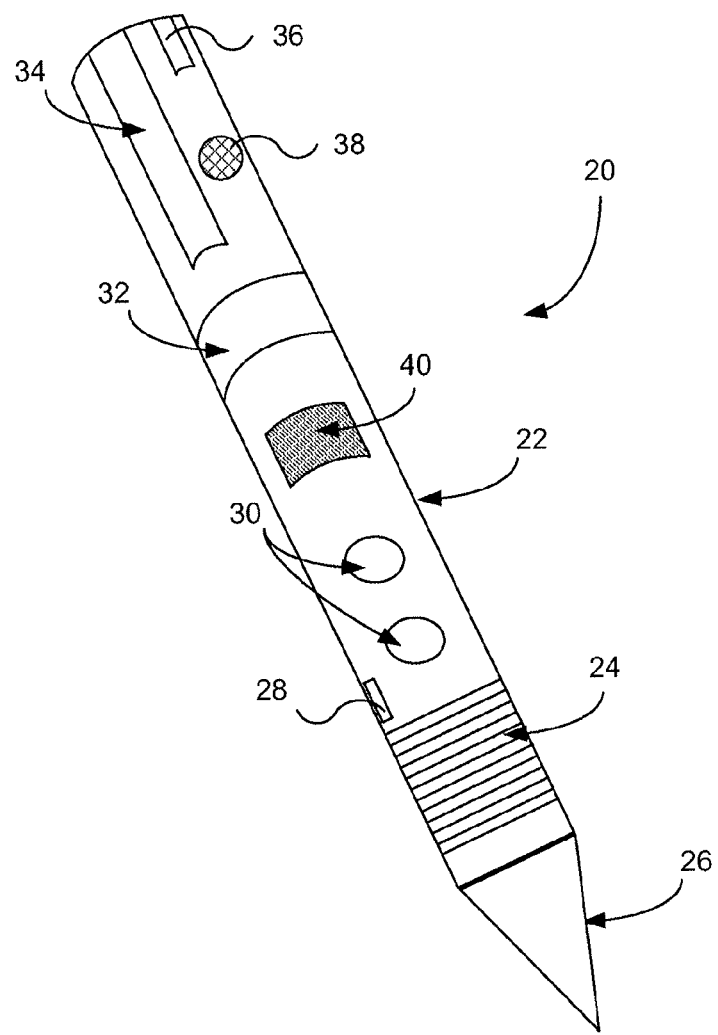
FIG. 2 illustrates an example active stylus exterior.

FIG. 2 illustrates an example exterior of an example active stylus 20. Active stylus 20 may include one or more components, such as buttons 30 or sliders 32 and 34 integrated with an outer body 22. These external components may provide for interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. The device may by any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g. 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis, while one or more wheel sliders 32 may be aligned along the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using a FPC.

Active stylus 20 may have one or more components configured to provide feedback to or accepting feedback from a user, such as, for example and without limitation, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator. As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionally. For example and not by way of limitation, dragging a finger across modified surface area 40 may initiate an interaction, such as data transfer, between active stylus 20 and a device.

One or more components of active stylus 20 may be configured to communicate data between active stylus 20 and the device. For example, active stylus 20 may include one or more tips 26 or nibs. Tip 26 may include one or more electrodes configured to communicate data between active stylus 20 and one or more devices or other active styluses. Tip 26 may be made of any suitable material, such as a conductive material, and have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
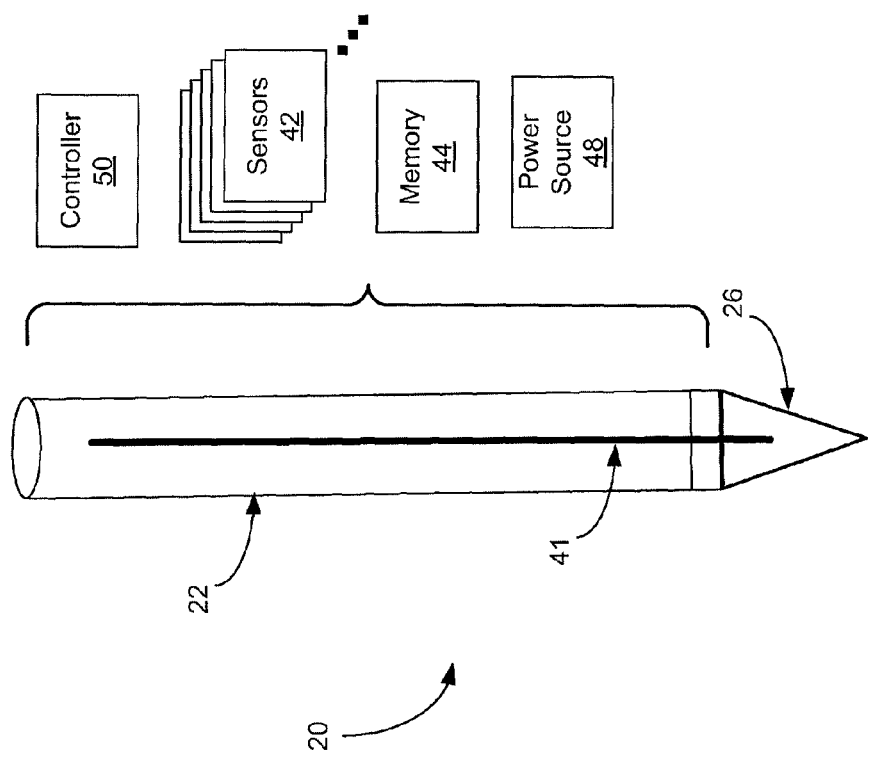
FIG. 3 illustrates an example active stylus interior.

FIG. 3 illustrates an example internal components of example active stylus 20. Active stylus 20 may include one or more internal components, such as a controller 50, sensors 42, memory 44, or power source 48. In particular embodiments, one or more internal components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users.

Controller 50 may be a microcontroller or any other type of processor suitable for controlling the operation of active stylus 20. Controller 50 may be one or more ICs—such as, for example, general-purpose microprocessors, microcontrollers, PLDs, PLAs, or ASICs. Controller 50 may include a processor unit, a drive unit, a sense unit, and a storage unit. The drive unit may supply signals to electrodes of tip 26 through center shaft 41. The drive unit may also supply signals to control or drive sensors 42 or one or more external components of active stylus 20. The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device. As an example and not by way of limitation, power may be inductively transferred between power source 48 and a power source of the device.

Figure 4:
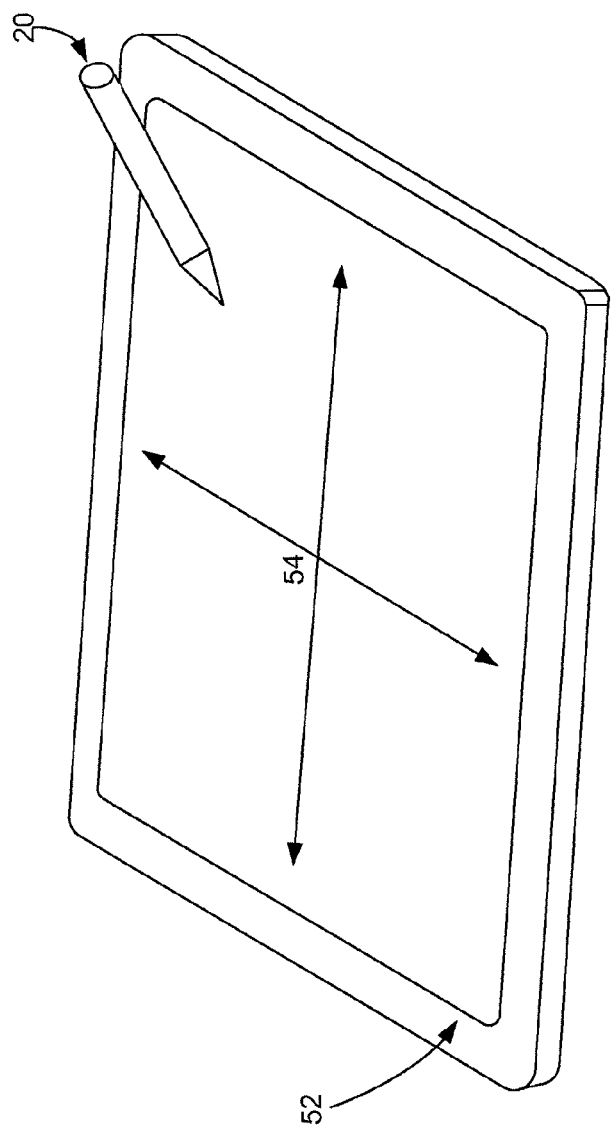
FIG. 4 illustrates an example active stylus with touch sensor device.

FIG. 4 illustrates an example active stylus 20 with an example device 52. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As example and not by way of limitation, device 52 electronics may include circuitry or other electronics for wireless communication to or from device 52, execute programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of data between active stylus 20 and device 52. As an example and not by way of limitation, active stylus 20 may be synchronized to device through a pre-determined bit sequence transmitted by the touch sensor of device 52. As another example, active stylus 20 may be synchronized to device by processing the drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example and not by way of limitation, when active stylus 20 is brought in contact with or in the proximity of touch-sensitive area 54 of device 52, signals generated by active stylus 20 may influence capacitive nodes of touch-sensitive area of device 52 or vice versa. As another example, a power source of active stylus 20 may be inductively charged through the touch sensor of device 52, or vice versa. Although this disclosure describes particular interactions and communications between active stylus 20 and device 52, this disclosure contemplates any suitable interactions and communications through any suitable means, such as mechanical forces, current, voltage, or electromagnetic fields.

In particular embodiments, measurement signal from the sensors of active stylus 20 may initiate, provide for, or terminate interactions between active stylus 20 and one or more devices 52 or one or more users, as described above. Interaction between active stylus 20 and device 52 may occur when active stylus 20 is contacting or in proximity to device 52. As an example and not by way of limitation, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

Figure 5:
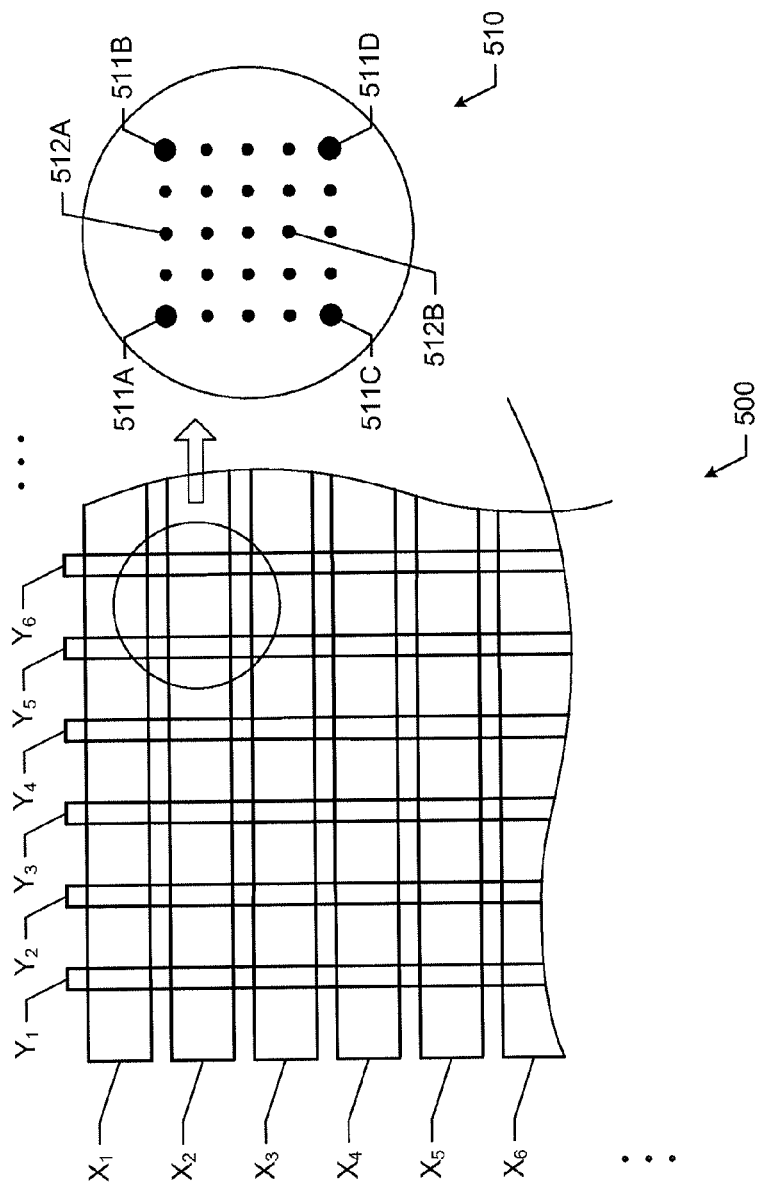
FIG. 5 illustrates an example touch-sensitive area of a touch sensor device.

As described above in connection with FIG. 1, in particular embodiments, a touch sensor (e.g., touch sensor 10 illustrated in FIG. 1) may include an array of drive and sense electrodes or an array of electrodes of a single type. These electrodes may be coupled to a controller (e.g., controller 12 illustrated in FIG. 1) by specific tracks (e.g., tracks 14 illustrated in FIG. 1). The drive unit of the controller may supply drive signals to the drive electrodes through some tracks, and the sense unit of the controller may sense charge at the capacitive nodes through other tracks. The electrodes may be arranged in various patterns and this disclosure contemplates any suitable patterns for the electrode arrangements. For example, FIG. 5 illustrates an example array of electrodes arranged in a X-Y grid pattern. In particular embodiments, the drive electrodes may be arranged along one set of lines (e.g., the X lines: $X_1$ to $X_n$) and the sense electrodes may be arranged along another set of lines (e.g., the Y lines: $Y_1$ to $Y_n$). The capacitive nodes are at one or more intersections of the X and Y lines. A touch-sensitive area 500 may be populated with these electrodes.

In particular embodiments, to determine the location of an object, such as a stylus or a user's finger, within a touch-sensitive area (e.g., touch-sensitive area 500), a scan of the electrodes or coordinates within the touch-sensitive area may be performed (e.g., driving the drive electrodes and scanning the capacitive nodes within touch-sensitive area 500). In some implementations, the drive electrodes are driven one line at a time. More specifically, a number of pulses (e.g., 3 or 4 pulses) is sent down each line of drive electrodes (e.g., each X line), and for each pulse, a number of signal samples (e.g., 1 or 2 samples) is read by scanning the corresponding capacitive nodes. For example, in FIG. 5, the drive electrodes along the $X_1$ line may be driven first; the charge is transferred through the capacitive coupling between the drive and sense lines; and the corresponding capacitive nodes along the Y lines (e.g., $Y_1$ to $Y_n$) may be scanned to take the signal samples. Then, the drive electrodes along the $X_2$ line are driven next; the charge is again transferred through the capacitive coupling between the drive and sense lines; and the corresponding capacitive nodes along the Y lines are scanned to take the signal samples. And so on, until the electrodes down the last line, $X_n$, are driven and the corresponding capacitive nodes down the Y lines are scanned to take the signal samples. The samples may be digitally quantized (e.g., via an analog-to-digital converter (ADC)). The digital samples are then transmitted in individual frames. In particular embodiments, a frame includes a full scan of some or all the capacitive nodes within a touch-sensitive area. As an example, in the case illustrated in FIG. 5, a frame includes [M×N] samples, where N denotes the number of X lines (e.g., drive lines) and M denotes the number of receive line.

In particular embodiments, active stylus 20 receives the signal or signals from one or more drive lines (e.g., the X lines in its vicinity) of device 52. The stylus (e.g., active stylus 20) may then process this received signal to create another signal to transmit back to device 52. As an example, the stylus may transmit a function of the received signal (whether linear or non-linear) that is then multiplied by a gain and that may be added to an offset value. Thus, if R is the signal received at active stylus 20 (e.g., from device 52), T is the signal transmitted by active stylus 20 (e.g., back to device 52), f is a function (whether linear or non-linear), A is a gain factor, and B is an offset, the transmitted signal T may be written as:

$$T = A*f(R) + B.$$

The signal R received by the stylus may be the series of pulses sent down each drive line that active stylus 20 is able to detect. In particular embodiments, the signal T transmitted by the stylus may also be a series of pulses. The transmitted signal T will create a transfer of charge through capacitive coupling between active stylus 20 and the sense lines (e.g., $Y_1$ to $Y_n$) of touch-sensitive area 500. Device 52, and, in particular embodiments, touch controller 12 may then receive samples of transmitted signal T via a scan of the nodes along the sense lines of touch-sensitive area 500. As described above, these samples may be digitally quantized and may be transmitted in individual frames (each frame including, for example, a full scan of the capacitive nodes in touch-sensitive area 500).

Active stylus 20 may transmit additional data to device 52 or touch controller 12 via the pulses that make up the transmitted signal T. As an example, active stylus 20 may transmit data regarding stylus status or information gathered from sensors 42 (e.g., pressure data, touch data, accelerometer data, or gyroscope data), power source 48 (e.g., battery life), electrodes in active stylus tip 26, memory 44, controller 50, buttons 30 (e.g. whether a button has been pressed), sliders 32, or any other data gathered by any other component of active stylus 20.

The stylus may transmit this data to device 52 or touch controller 12 by modulating the data onto the pulses that make up transmitted signal T. The modulation of the data may occur, for example, in controller 50 and be transmitted via center shaft 41 and through electrodes in active stylus tip 26. As an example of data modulation, active stylus 20 may change the amplitude (i.e., amplitude shift keying including on-off keying), phase (i.e., phase shift keying), or frequency (i.e., frequency shift keying) of the pulses sent in order to transmit information. In particular embodiments, this modulation of the data may include changing the amplitude by changing the gain A used to create transmitted signal T. In yet other embodiments, this modulation of the data may include changing the amplitude by changing the offset B used to create transmitted signal T. In yet other embodiments, the modulation of the data may include changing the frequency or phase by changing the function f used to create transmitted signal T.

In particular embodiments, active stylus 20 may transmit modulated data on a pulse-by-pulse basis. As an example, the stylus may wish to transmit information regarding pressure data gathered from a pressure sensor. The stylus may digitize this pressure information using an analog-to-digital converter (ADC). The bits of the digitized pressure information value may be transmitted by the stylus such that one bit of data is transmitted per pulse. If, in this example, the stylus uses amplitude shift keying to modulate the data, then at each pulse, the stylus will adjust the amplitude of the pulse to be one of two pre-set amplitude values. In the case of on-off shift keying, the amplitude value that represents the binary value "0" is itself 0, and the second amplitude value may represent the binary value "1." The touch controller 12 may know the pre-set amplitude values, as well, and with this information may demodulate the bit stream sent through the series of pulses and recover the pressure data. Thus, in this manner, the bits that encode the value of the pressure information may be transmitted one at a time, one bit per pulse transmitted, using variations in the amplitudes of the pulses.

Figure 6:
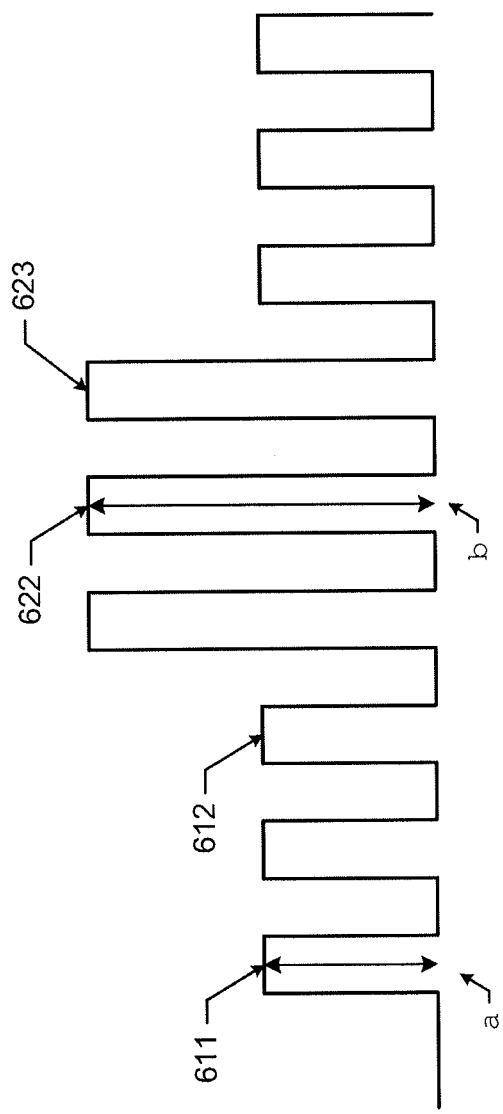
FIG. 6 illustrates an example method for communication from an active stylus to a touch sensor device.

FIG. 6 illustrates an example embodiment of the transmission of data from active stylus 20 to touch controller 12 on a pulse-by-pulse basis using on-off keying. Pulses 611 and 612 each have an amplitude of 'a', which may represent the binary value "0." Pulses 622 and 623 each have an amplitude of 'b', which may represent the binary value "1." Thus, the bit stream of FIG. 6 conveys the bits "0" "0" "0" "1" "1" "1" "0" "0" "0" from active stylus 20 to touch controller 12. Amplitude values 'a' and 'b' form the set of two amplitude values that both active stylus and touch controller 12 know, so that the signal may be demodulated by touch controller 12.

Although the foregoing example described digital modulation of data on a pulse-by-pulse basis, analog data may also be modulated on a pulse-by-pulse basis. As an example, if the pressure data is not digitized, it may still be conveyed from the stylus to device 52 or controller 12 using amplitude changes in the pulses. In this example, the value of the analog pressure data may be added to the standard offset value B for each pulse. By doing this, the amplitude of each pulse can convey the actual, analog value of the pressure data. Touch controller 12 may, in particular embodiments, recover the value of the pressure data by knowing the value B ahead of time (and subtracting B from the amplitude of the pulse received from the stylus). Each pulse in this example, therefore, conveys more than simply one bit of information it conveys the actual value of the pressure data. In particular embodiments, the value of the pressure data may be quantized.

In particular embodiments, active stylus 20 may transmit modulated data on a frame-by-frame basis. As an example, the stylus may wish to transmit information regarding pressure data gathered from a pressure sensor. The stylus may digitize this pressure information using an analog-to-digital converter (ADC). The bits of the digitized pressure information value may be transmitted by the stylus such that one bit of data is transmitted per frame. Thus, if the frame rate is 200 Hz, the data rate (given one bit per frame) would be 200 bits per second. If, in this example, the stylus uses amplitude shift keying to modulate the data, then at each frame, the stylus will choose one of two pre-set amplitude values to use for every pulse transmitted in that frame. In the case of on-off shift keying, the amplitude value that represents the binary value "0" is itself 0, and the second amplitude value may represent the binary value "1." The touch controller 12 may know the pre-set amplitude values, as well, and with this information may demodulate the bit stream sent through the series of frames (i.e., the changing pulse amplitudes from frame to frame) and recover the pressure data. Thus, in this manner, the bits that encode the value of the pressure information may be transmitted one at a time, one bit per frame transmitted, using variations in the amplitudes of the pulses.

Although the foregoing example described digital modulation of data on a frame-by-frame basis, analog data may also be modulated on a frame-by-frame basis. As an example, if the pressure data is not digitized, it may still be conveyed from the stylus to device 52 or touch controller 12 using amplitude changes in the pulses. In this example, the value of the analog pressure data may be added to the standard offset value B for every pulse in a frame. By doing this, the amplitude of the pulses in a frame can convey the actual, analog value of the pressure data. Touch controller 12 may, in particular embodiments, recover the value of the pressure data by knowing the value B ahead of time (and subtracting B from the amplitude of the pulses received in a frame from the stylus). Each frame in this example, therefore, conveys more than simply one bit of information—it conveys the actual value of the pressure data. In particular embodiments, the value of the pressure data may be quantized.

In particular embodiments, each data-conveying unit (whether a frame or a pulse) may convey data in and of itself, or, alternatively, it may convey data in a differential form through comparison to prior (or future) data units. As an example, active stylus 20 may transmit analog pressure data on a frame-by-frame basis using amplitude modulation. Active stylus 20 may, in each frame, convey the analog pressure data value by adding this value to the amplitude of each pulse in the frame (e.g., adding the value to offset B, a value that touch controller 12 knows), thereby conveying the pressure data directly. Alternatively, active stylus 20 may differentially convey the pressure data by adding the pressure data value to the value of the amplitude of the pulses in the previous frame and using this new amplitude value for all the pulses in the current frame. Touch controller 12 may recover the pressure data value (without needing any reference information like B) by simply subtracting the amplitude of a pulse of the current frame from the amplitude of a pulse of the previous frame. The choice of frame-based or pulse-based data transmission may, in particular embodiments, depend on the type of data being transmitted. As examples, pressure data may be transmitted on a pulse-by-pulse basis, and battery life information or input from buttons may be transmitted on a frame-by-frame basis.

Although the specific examples discussed above illustrate the use of on-off keying or amplitude shift keying, active stylus 20 may also use frequency shift keying, phase shift keying, or any other suitable data modulation scheme to transmit data (whether digital or analog) on a pulse-by-pulse or frame-by-frame basis. In particular embodiments, both frame-based and pulse-based communication schemes may be used simultaneously by active stylus 20 and device 52. Active stylus 20 may encode the data (using, e.g., error-correcting codes) or add a packet header describing the data packet's contents or encoding before transmitting it to device 52 or touch controller 12. Data may be transmitted in groups other than pulses or frames encompassing the entire touch-sensor area. For example, data may be transmitted on a fraction of a frame basis. Data transmission may, in particular embodiments, occur on the same communication layer (e.g., physical layer) regardless of whether the data is transmitted per frame or per fraction of a frame. Different types of data (e.g. pressure and battery life) may be communicated in a time-multiplexed manner between pulses or frames. Touch controller 12 may have the same logic as active stylus 20 for the transmission or receipt of data using any of the communication schemes described.

Figure 7A:
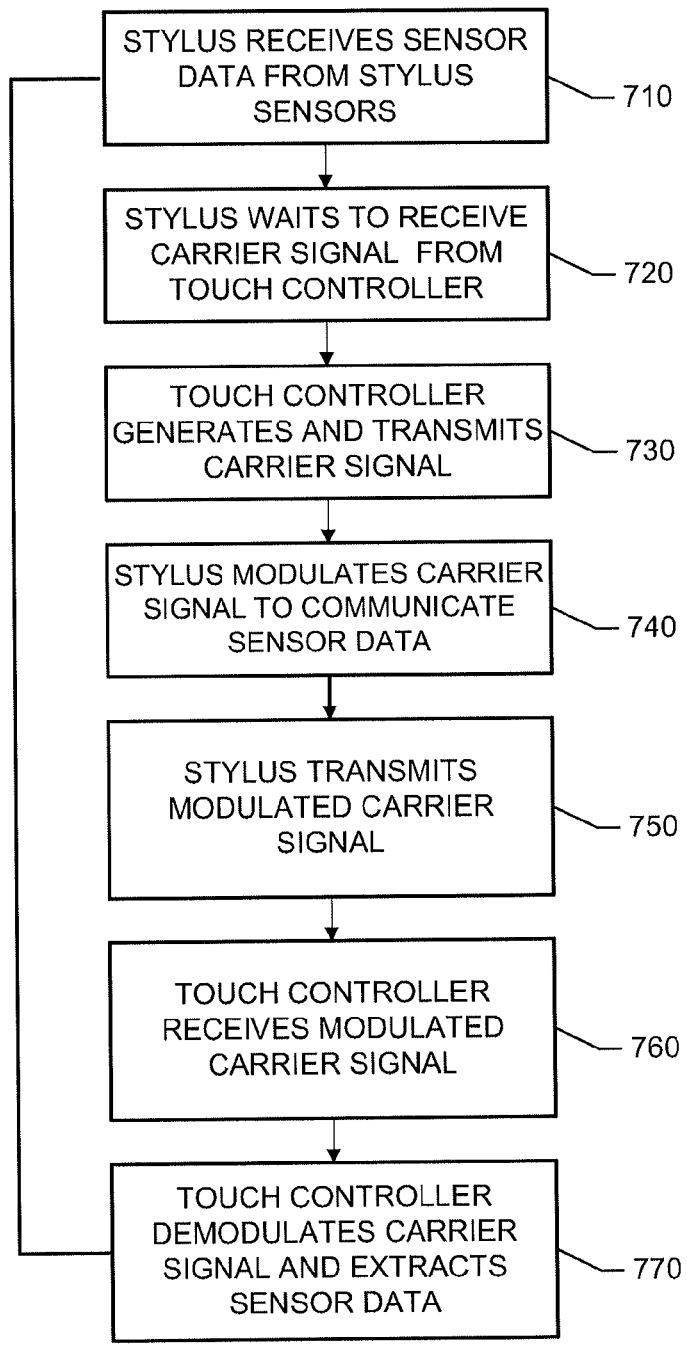
FIG. 7A illustrates an example method for communicating modulated data between an active stylus and a device.

FIG. 7A illustrates an example method for communicating modulated data between active stylus 20 and device 52, including touch controller 12. The method may start at step 710, where active stylus 20 receives sensor data from sensors 42. At step 720, active stylus 20 waits to receive a carrier signal from touch controller 12. At step 730, a carrier signal is generated by touch controller 12 and transmitted to active stylus 20. At step 740, the carrier signal is modulated by active stylus 20 to include the sensor data so that the sensor data may be communicated from active stylus 20 to touch controller 12. At step 750, the modulated carrier signal including the sensor data is transmitted from active stylus 20 to touch controller 12. In particular embodiments, steps 710, 720, 740, and 750 may occur in controller 50 of active stylus 20. At step 760, touch controller 12 receives the modulated carrier signal including the sensor data. At step 770, touch controller 12 demodulates the carrier signal and extracts the sensor data. In particular embodiments, the steps illustrated in FIG. 7A may be repeated any number of times (e.g., any number of iterations). For example, during a second iteration, a second carrier signal may be modulated with sensor data (whether the same sensor data or different sensor data). This second signal may then be transmitted at step 750. Although this disclosure describes and illustrates particular steps of the method of FIG. 7A as occurring in a particular order, this disclosure contemplates any suitable steps of the method of FIG. 7A occurring in any suitable order. Furthermore, although this disclosure describes and illustrates particular components, devices, or systems carrying out particular steps of the method of FIG. 7A, this disclosure contemplates any suitable combination of any suitable components, devices, or systems carrying out any suitable steps of the method of FIG. 7A.

Figure 7B:
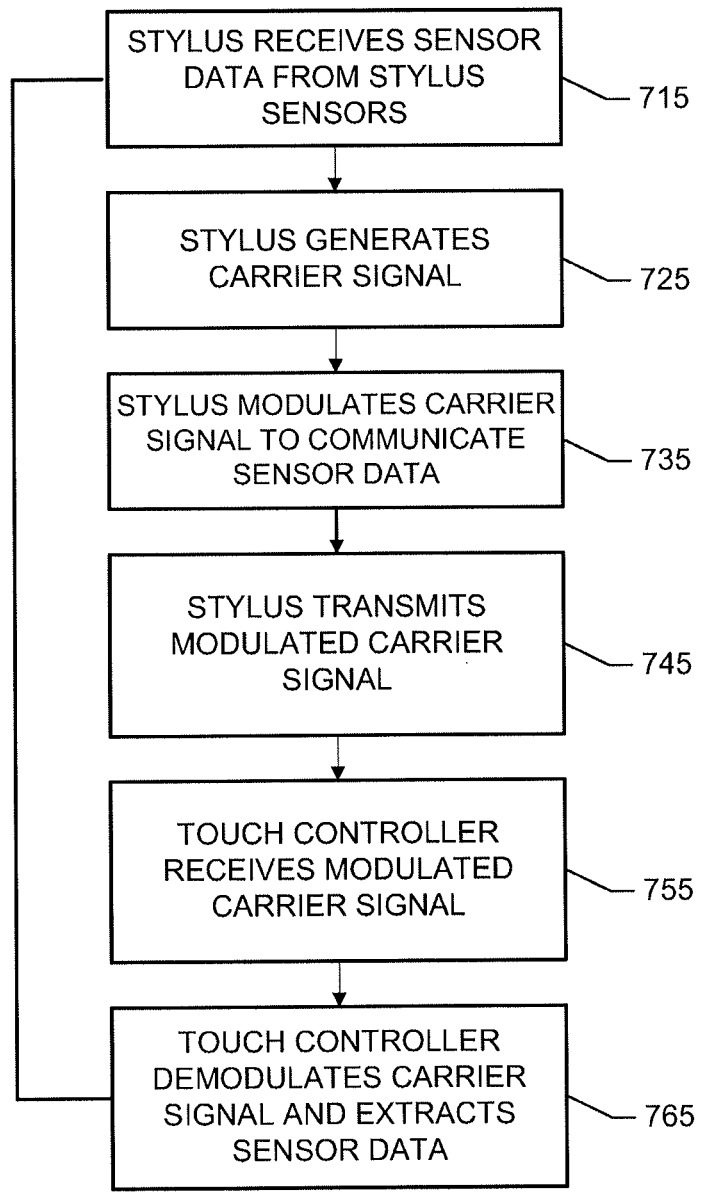
FIG. 7B illustrates an example method for communicating modulated data between an active stylus and a device.

FIG. 7B illustrates another example method for communicating modulated data between active stylus 20 and device 52, including touch controller 12. The method may start at step 715, where active stylus 20 receives sensor data from sensors 42. At step 725, active stylus 20 generates a carrier signal. At step 735, the carrier signal is modulated by active stylus 20 to include the sensor data so that the sensor data may be communicated from active stylus 20 to touch controller 12. At step 745, the modulated carrier signal including the sensor data is transmitted from active stylus 20 to touch controller 12. In particular embodiments, steps 715-745 may occur in controller 50 of active stylus 20. At step 755, touch controller 12 receives the modulated carrier signal including the sensor data. At step 765, touch controller 12 demodulates the carrier signal and extracts the sensor data. In particular embodiments, the steps illustrated in FIG. 7B may be repeated any number of times (e.g., any number of iterations). For example, during a second iteration, a second carrier signal may be modulated with sensor data (whether the same sensor data or different sensor data). This second signal may then be transmitted at step 745. Although this disclosure describes and illustrates particular steps of the method of FIG. 7B as occurring in a particular order, this disclosure contemplates any suitable steps of the method of FIG. 7B occurring in any suitable order. Furthermore, although this disclosure describes and illustrates particular components, devices, or systems carrying out particular steps of the method of FIG. 7B, this disclosure contemplates any suitable combination of any suitable components, devices, or systems carrying out any suitable steps of the method of FIG. 7B.

In particular embodiments, modulated data may also be communicated from device 52, including touch controller 12, to active stylus 20. As an example, touch controller 12 may gather data (e.g., control data or command data) from device 52 (including, for example, touch-sensitive area 500), modulate a carrier signal to include the data, and transmit the data to active stylus 20. In particular embodiments, the carrier signal may be generated by active stylus 20 and transmitted to touch controller 12 for modulation by touch controller 12. In other embodiments, the carrier signal may be generated by touch controller 12 and modulated by touch controller 12. In yet other embodiments, both active stylus 20 and touch controller 12 may generate the carrier signal for modulation. Additionally, active stylus 20 may receive the modulated carrier signal, demodulate the carrier signal, and extract the data in the signal. The carrier signal may, in particular embodiments, be modulated by active stylus 20, touch controller 12, or both. In yet other embodiments, two or more carrier signals may be generated or modulated by both active stylus 20 and touch controller 12, either simultaneously or at different times, providing for implementations of frequency or phase modulation. Any or all of the variations or example embodiments discussed with respect to the transmission of modulated data from active stylus 20 to touch controller 12 (including, for example, the type of modulation scheme) may be applied to the transmission of modulated data from touch controller 12 to active stylus 20, and vice versa.

In particular embodiments, active stylus 20 works in synchronization with touch controller 12. In these embodiments, active stylus 20 may detect a drive signal from the drive lines of touch-sensitive area 500 and reply back to touch controller 12 within a touch-sensing time window of the touch controller 12. Touch controller 12 may scan the touch-sensitive area 500 until it detects active stylus 20, and once it has detected active stylus 20, it may use a "handshake" to confirm before transmitting data to active stylus 20. Touch controller 12 may detect the stylus or synchronize with the stylus based on the nature of the stylus response signal (including, for example, side lobes of the stylus response due to non-linear gain at the stylus). Once active stylus 20 is detected, touch controller 12 may transmit a variable number of extra pulses down one or more drive lines (e.g., the X lines illustrated in FIG. 5) of touch-sensitive area 500. Active stylus 20 may, upon seeing these extra pulses, respond in a pre-determined fashion (e.g., a signature or code). After this handshake, touch controller 12 may cease to drive any X lines and may continue to listen for transmissions from active stylus 20. Active stylus 20 may then transmit data using any of the data communication schemes described. The stylus may maintain a counter with data about past pulses it has received from device 52 (including touch-sensitive area 500 or touch controller 12) or pulses it has transmitted. Once active stylus 20 has completed its data transmission, it may send a stop bit to let touch controller 12 know that it may restart its normal scanning or driving of touch-sensitive area 500.

Herein, reference to a computer-readable non-transitory storage medium encompasses a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable non-transitory storage medium or a combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A stylus comprising:
   one or more sensors;
   one or more electrodes configured to communicate with a device by receiving signals from and transmitting signals to a touch sensor of the device; and
   one or more computer-readable non-transitory storage media embodying logic that is operable when executed to:
      receive sensor data from the one or more sensors;
      receive a first signal generated by the device;
      generate a second signal by modulating a carrier signal based on the sensor data; and
      transmit to the device, in response to the first signal, the second signal, the sensor data being obtainable by demodulating the second signal.

2. The stylus of claim 1, wherein the first signal is the carrier signal modulated to generate the second signal.

3. The stylus of claim 1, wherein the second signal is generated using one of:
   amplitude modulation;
   frequency modulation; and
   phase modulation.

4. The stylus of claim 1, wherein:
   the one or more sensors comprise a pressure sensor and a button; and
   the sensor data comprises pressure data and button state data.

5. The stylus of claim 1, wherein the sensor data is digital.

6. The stylus of claim 1, wherein the second signal is transmitted in a single electric pulse.

7. One or more computer-readable non-transitory storage media embodying logic that is operable when executed to:
   receive sensor data from one or more sensors in or on a stylus, the stylus comprising one or more electrodes configured to communicate with a device by receiving signal from and transmitting signals to a touch sensor of the device;
   receive a first signal generated by the device;
   generate a second signal by modulating a carrier signal based on the sensor data; and
   transmit to the device, in response to the first signal, the second signal, the sensor data being obtainable by demodulating the second signal.

8. The media of claim 7, wherein the first signal is the carrier signal modulated to generate the second signal.

9. The media of claim 7, wherein the second signal is generated using one of:
   amplitude modulation;
   frequency modulation; and
   phase modulation.

10. The media of claim 7, wherein:
    the one or more sensors comprise a pressure sensor and a button; and
    the sensor data comprises pressure data and button state data.

11. The media of claim 7, wherein the sensor data is digital.

12. The media of claim 7, wherein the second signal is transmitted in a single electric pulse.

13. A system comprising:
    a device comprising a touch sensor; and
    a stylus comprising:
       one or more sensors;
       one or more electrodes configured to communicate with a device by receiving signals from and transmitting signals to a touch sensor of the device; and one or more computer-readable non-transitory storage media embodying logic that is operable when executed to:
receive sensor data from the one or more sensors;
receive a first signal generated by the device;
generate a second signal by modulating a carrier signal based on the sensor data; and
transmit to the device, in response to the first signal, the second signal, the device being operable to obtain the sensor data by demodulating the second signal.

14. The system of claim 13, wherein the first signal is the carrier signal modulated to generate the second signal.

15. The system of claim 13, wherein the second signal is generated using one of:
amplitude modulation;
frequency modulation; and
phase modulation.

16. The system of claim 13, wherein:
the one or more sensors comprise a pressure sensor and a button; and
the sensor data comprises pressure data and button state data.

17. The system of claim 13, wherein the sensor data is digital.

18. The system of claim 13, wherein the second signal is transmitted in a single electric pulse.

* * * * *